United States Patent [19]
Jaerisch et al.

[11] 3,858,981
[45] Jan. 7, 1975

[54] METHOD OF MEASURING IRREGULARITIES IN THE EVENNESS OF SURFACES

[75] Inventors: Walter Jaerisch, Boeblingen; Guenter Makosch, Maichingen, both of Germany

[73] Assignee: International Business Machines Corporation, Armonk, N.Y.

[22] Filed: Aug. 3, 1972

[21] Appl. No.: 277,724

[30] Foreign Application Priority Data
  Aug. 9, 1971 Germany............................ 2139836

[52] U.S. Cl.............. 356/109, 356/111, 356/169, 250/237 G
[51] Int. Cl. ............................................ G01b 9/02
[58] Field of Search ........... 356/106, 109, 111, 169, 356/170, 171, 120; 250/237 G

[56] References Cited
UNITED STATES PATENTS
| | | | |
|---|---|---|---|
| 2,867,149 | 1/1959 | Goddard............................ | 356/120 |
| 3,185,022 | 5/1965 | Holeman............................ | 356/120 |
| 3,614,237 | 10/1971 | Kyle.................................. | 356/169 |
| 3,627,427 | 12/1971 | Johnson............................. | 356/120 |

OTHER PUBLICATIONS

The Interference System of Crossed Diffraction Gratings, J. Guild, Clarendon Press, 1956.
Guild, The Interference Systems of Crossed .... Gratings, pp. 54–59.

Primary Examiner—Ronald L. Wibert
Assistant Examiner—Conrad Clark
Attorney, Agent, or Firm—Howard J. Walter, Jr.

[57] ABSTRACT

Apparatus and method of measuring surface irregularities by means of the interference field occurring behind a diffraction grid. Light bars are generated which are reflected from the surface to be tested back onto the grid. If the surface includes irregularities down to 1 micron and under, moire patterns which are a function of the height and width of the irregularities become visible on the opposite side of the grid. By suitably selecting the direction of observation, the moire patterns are superimposed by interference fringes which permit the moire patterns to be accurately gauged.

3 Claims, 5 Drawing Figures

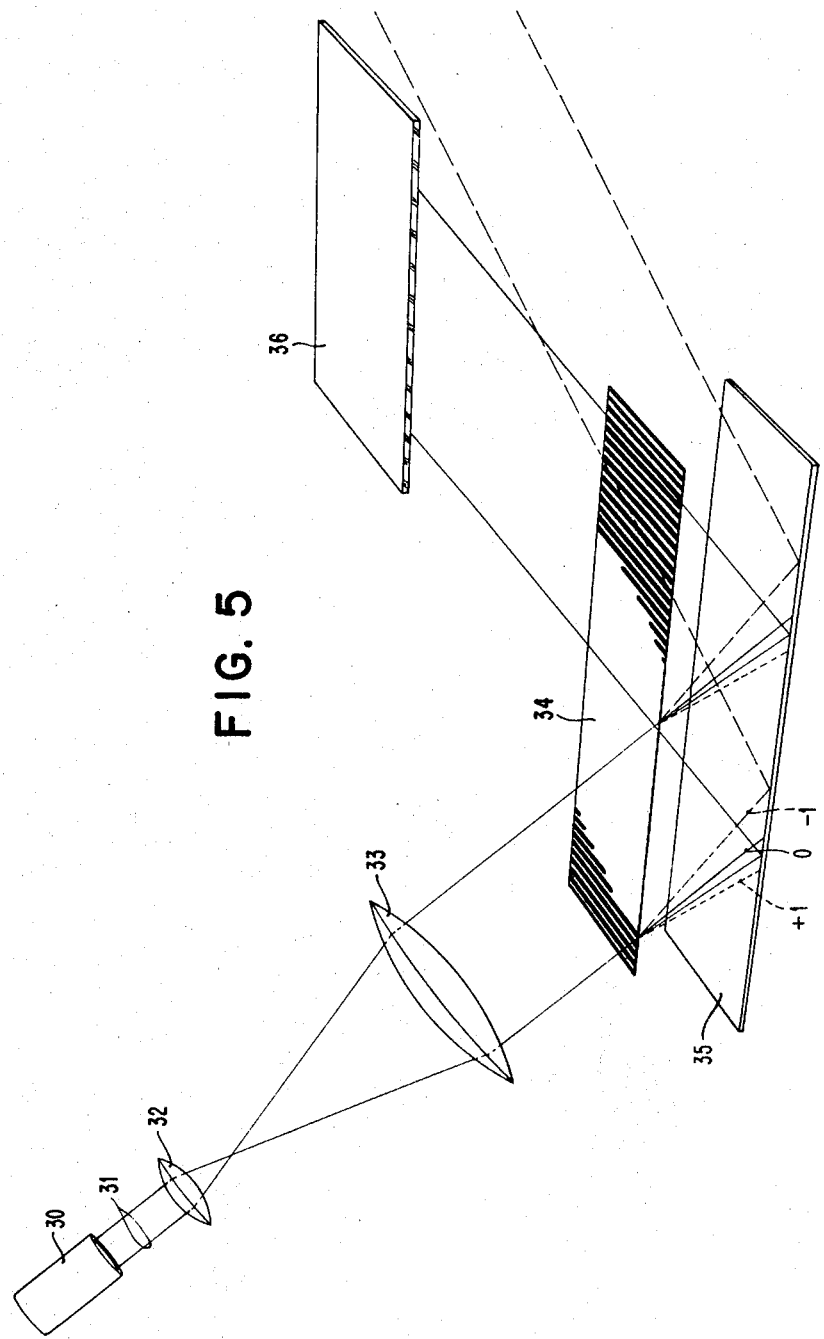

METHOD OF MEASURING IRREGULARITIES IN THE EVENNESS OF SURFACES

BACKGROUND OF THE INVENTION

1. Field of the Invention

The invention relates to an optical method of measuring irregularities in the evenness of surfaces by generating a periodic light pattern, and more particularly to an improved interferometric surface measuring method and apparatus.

In many fields of technology, in particular for the testing of semi-manufactured and finished products, it is necessary to continuously test the quality and evenness of surfaces or surface elements. To this end measuring processes are required which permit determining at a glance whether the deviations of a tested surface from a given plane are within or outside a permissible tolerance range. The probing lever equipment or mechanical measuring gauges previously employed for testing are not suitable for testing great numbers of surfaces owing to the time requirements inherent in measuring a plurality of single points. Apart from this, the measuring accuracy of such arrangements is only limited and mechanical damage to the measured surfaces cannot be safely avoided. Known interferometric measuring processes, although eliminating the latter two disadvantages, still have the disadvantage of permitting only point-by-point measuring. In addition, most known measuring processes are extremely cumbersome and time-consuming for measuring ranges amounting to a multiple of the wavelength of the radiation employed.

2. Prior Art

The publication "Moire Contours" in "Optical and Laser Technology" p. 226 refers to a method of representing the contours of uneven bodies, wherein the object is illuminated through a grid by means of a point light source and the grid used for illumination or a similar grid is employed for observing the object. The resolution of this method is about 1 mm. A similar method is described in the publication "Moire Topographic Maps" by J. Wasowski in "Optics Communications," Vol. 2, No. 7, December 1970, pp. 321 to 323. The publication "High-Efficienty Phase Hologram Gratings" by A. Schmackpfeffer, W. Jaerisch, and W. W. Kulke, IBM Journal of Research and Development, Vol. 14, No. 5, September 1970, pp. 533 to 538 describes a method of generating high-efficiency phase hologram gratings. In the case of the moire methods described in the former two publications level lines are generated by grids of the same constant and direction being superimposed upon each other by projection on the object to be measured. It is also possible to project only one grid onto the object to be measured and to observe the projection of this grid through this or a similar grid.

It is obvious that the resolution of these methods, in particular the depth resolution, is a function of the grid constant. As the distance from the grid at which the contours of the grid lines are still sharply defined and free from interference phenomena is reduced as the grid constant decreases, and, for practical reasons, the distance between grid and object cannot be reduced at random, the moire method only lends itself to applications in which the extension in depth of the irregularities to be resolved exceeds some 0.1 mm.

Interferometric methods utilizing Fizeau interference fringes have also been used to examine surface flatness. A problem with this technique is that the contour height difference represented by two adjacent fringes is equal to one-half the wavelength of the monochromatic illuminating light. For testing surfaces such as semiconductor wafers having height variations on the order of 20 microns or more, Fizeau interference fringes having a height discrimination of about 0.25 to 0.35 microns is too small making evaluation and measurements difficult and time consuming. In the publication "Optik in der Laengenmesstechnik" by F. Hodam, 1962, p. 263 it is proposed that interferometric measuring be performed, utilizing several wavelengths at the same time. The interference fringes generated by the individual wavelengths only superimpose each other in particular periodically recurring positions. These superimposed fringes permit vernier reading, i.e., the maximum unit that can be read is the superimposed fringes of all the colours employed, rather than the interference fringes proper. In this way the cumbersome counting of the individual interference fringes and the error sources this entails are eliminated. It has been found, however, that the detection and thus the counting of the superimposed fringes, in particular for applications utilizing several closely adjacent wavelengths, is intricate and unreliable. Therefore, it has been proposed that the interference fringes associated with the individual wavelengths be photographically recorded and that for evaluation the recorded fringes be superimposed upon each other by projection. This method, however, is extremely cumbersome, time-consuming and expensive. In particular the change in the ratio of the number of superimpositions of the interference fringes associated with the individual wavelengths and the distances to be measured is very cumbersome.

SUMMARY OF THE INVENTION

It is therefore an object of this invention to provide a method of eliminating the above-mentioned disadvantages and which permits irregularities, of at least partially reflecting surfaces, falling within the micron range to be simply and readily detected. In addition, the resolution of apparatus operated in accordance with the invention is such that it can be readily varied over a wide range.

To this end the invention utilizes a method of measuring irregularities in the evenness of surfaces by generating a periodic light pattern, characterized in that by radiation incident upon an optical diffraction grid an interference field is generated consisting of rectangular light bars arranged adjacent to each other in comblike fashion, that this interference field is reflected from the surface to be tested back onto the diffraction grid, and that by diffraction of the reflected interference field on the diffraction grid curves are generated representing the irregularities of the tested surface. As these curves are obtained by twice diffracting the radiation impinging upon the grid, they are called double diffraction lines.

As the depth of the Fizeau interference field generated behind the diffraction grid is a function of the grid constant and width and thus necessitates that the radiation employed be sufficiently coherent, the method in accordance with the invention permits measuring and detecting irregularities of a few microns, whose distance from the grid is more than ten thousand times their extension in depth, i.e. on the order of several centimeters. The method in accordance with the invention is particularly advantageous for measuring surfaces having a good reflectivity and which previously could not be measured by the known moire method.

A particularly advantageous embodiment of the method in accordance with the invention is characterized in that the interference field, formed by the zeroth and the first diffraction order, is evaluated by selecting the direction of observation.

A further preferred embodiment of the invention is characterized in that observation is effected in the direction of the zeroth order of the first order diffracted during the first pass through the grid.

Still a further preferred embodiment of the invention is characterized in that the distances of the double diffraction lines, which are associated with the size of the depth extension of the irregularities and which are generated by the interference field being diffracted on the grid, are gauged by the superimposed interference fringes generated by interference of the radiation reflected on the grid and the surface to be tested.

A further preferred embodiment of the invention is characterized in that the first diffraction order generated on the grid by reflection and the zeroth diffraction order generated during the second pass through the grid and which ia derived from the first order generated during the first pass through the grid and reflected on the surface to be tested are used to form the interference fringes.

The foregoing and other objects, features and advantages of the invention will be apparent from the following more particular description of the invention as illustrated in the accompanying drawings.

DESCRIPTION OF THE DRAWINGS

FIG. 5 is a diagrammatic representation of an arrangement for applying the method in accordance with the invention, utilizing coherent light.

Figure 1:
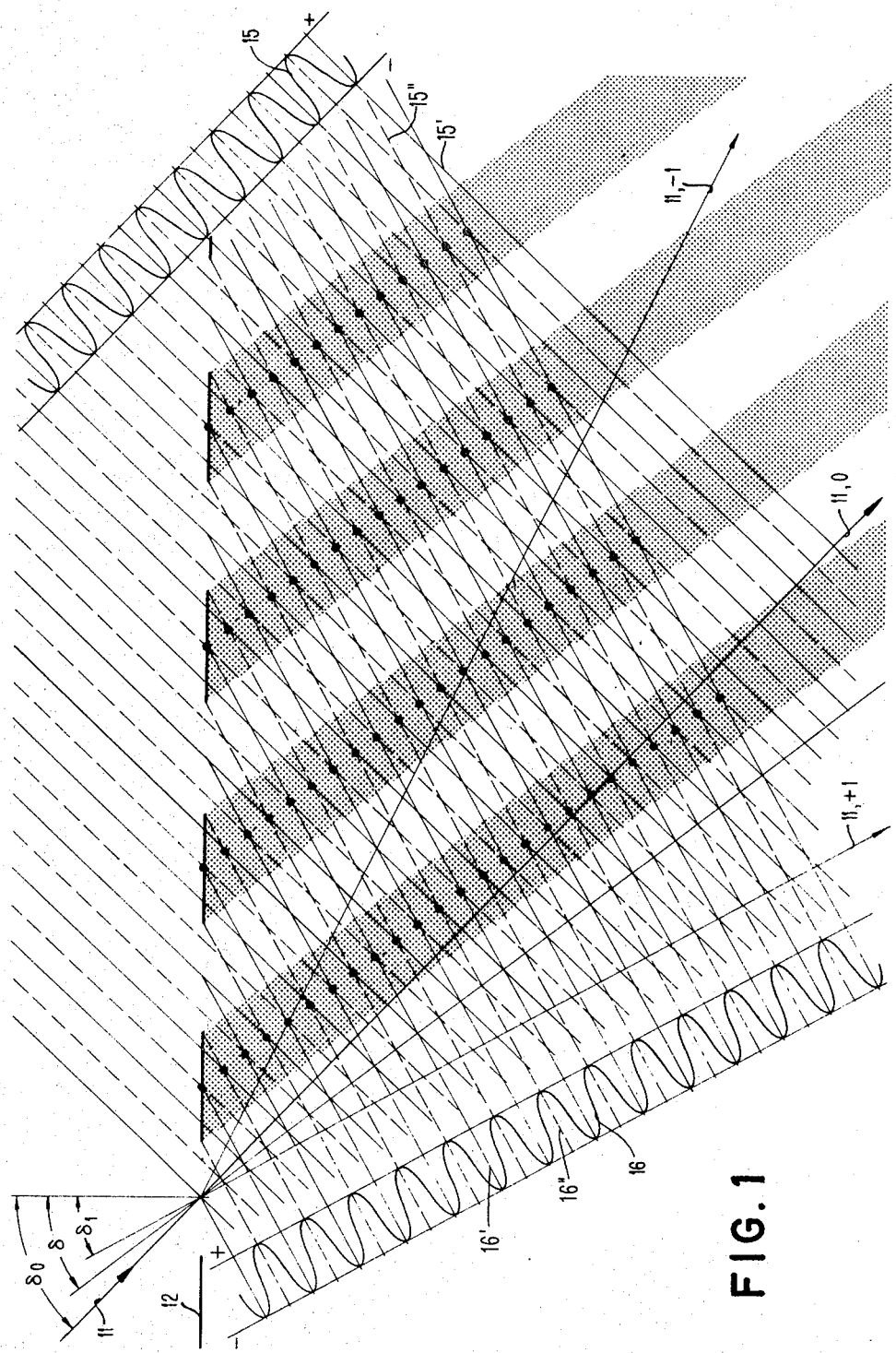
FIG. 1 is a diagrammatic representation of the interference field occurring behind an optical grid.

In accordance with FIG. 1, a coherent parallel ray from the direction marked by arrow 11 impinges upon an optical grid 12 whose constant is in the order of 1 micron. Below this grid an interference pattern, which may be formed as follows, is generated by interference of the zeroth diffraction order with the plus first diffraction order, i.e. the radiations designated as 11,0 and 11,+1. Radiation fields 11,0 and 11,+1 have the same wavelength and fixed phase positions, as are indicated, for example, by sine curves 15 and 16, respectively. From each minimum of the amplitudes indicated by curve 15 a full line 15' is drawn, extending parallel to the wavefront of radiation 11,0, and from each maximum a broken line 15'' is drawn extending parallel to the first. In addition, a broken line 16'', extending parallel to the wavefront of radiation 11,+1, is drawn from each maximum of curve 16, and a full line 16' is drawn parallel to the first from each minimum of curve 16. It will be seen that maxima and minima respectively occur at those points where full lines intersect full lines or broken lines intersect broken lines and where full lines intersect broken lines. The resulting interference pattern consists of rectangular light bars arranged adjacent to each other in comblike fashion. These light bars are formed by radiations 11,+1 and 11,0 and extend in a direction $\delta = (\delta_0 + \delta_1)/2$, where $\delta_0$ and $\delta_1$ are the angles included by the normal and the zeroth (11,0) and the plus first (11,+1) diffraction order, respectively.

Figure 2:
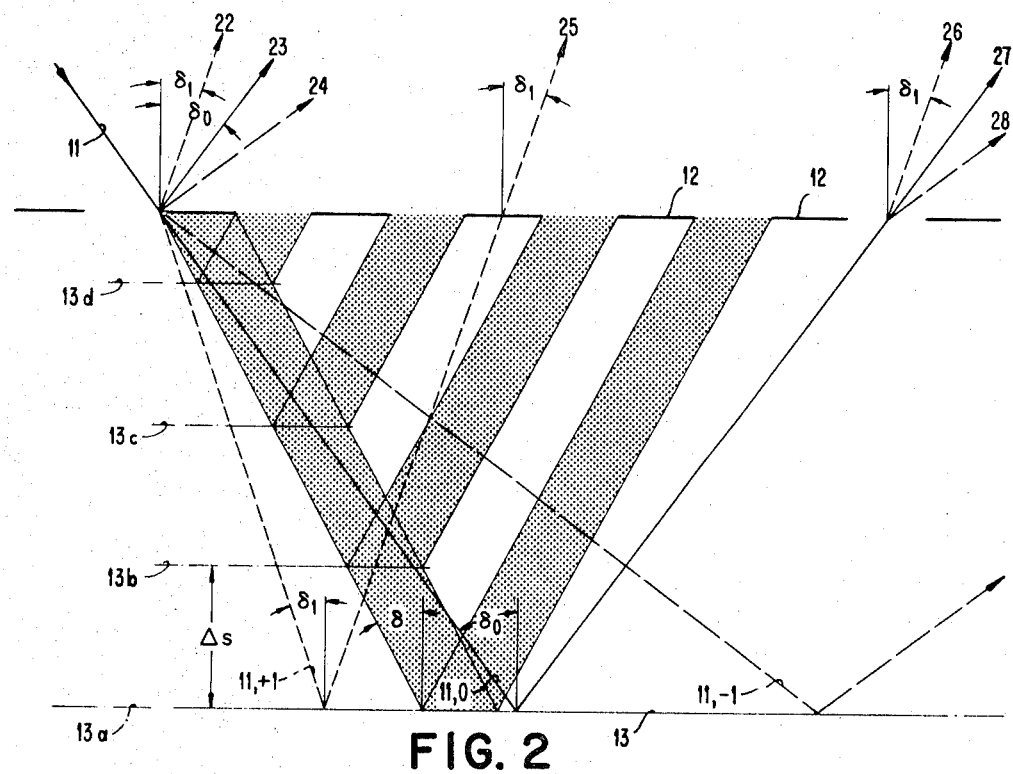
FIG. 2 is a diagrammatic representation of the diffraction orders and the directions of observation to be evaluated in accordance with the method of the invention.

FIG. 2 is a quantitative representation of the conditions in detail. The parallel coherent radiation impinging in the direction of the arrow 11 is split on grid 12 into diffraction orders of +1, 0 and −1 (11,+1; 11,0 and 11,−1). A reflecting surface 13 disposed parallel to grid 12 and introduced into the interference field causes the interference field to be tilted about this plane and to impinge at an angle of $\delta = (\delta_0 + \delta_1)/2$ upon the lower side of grid 12. If plane 13 contains irregularities, the reflected interference pattern is deformed accordingly. Diffraction of the reflected interference pattern on the lower side of grid 12 results in a fringe system wherein the fringes connect those points of the grid which are equidistant to the corresponding surface elements. These fringes are referred to as double diffraction lines, since they are generated on grid 12 by double diffraction.

Assuming parallelism between grid 12 and reflecting surface 13, the Fizeau interference pattern, or light bars, produced by grid 12, will be reflected from surface 13 back onto grid 12 to produce dark or light fringes, or combinations thereof, depending upon the distance between grid 12 and reflecting surface 13. For a surface height change $s$, a transition from a dark to a light fringe will occur according to the following relationship $$s = g/4 \tan \delta \tag{1}$$

where $g$ is the grid constant and $\delta$ the grid transmission angle.

Dark fringes occur at those points where the distance $h$ of the reflected surface elements from the grid plane is an odd multiple of $s$, i.e., $$h = m \cdot s \quad \text{where } m = 1, 3, 5 \ldots \tag{2}$$

At these points the interference maxima coincide with the opaque areas of grid 12. For $$h = n \cdot s \quad \text{where } n = 2, 4, 6 \ldots \tag{3}$$

the interference maxima coincide with the transparent grid areas. Thus a profile line system of the surface results above a reflecting test object.

In accordance with equations 1, 2 and 3 the change in the surface profile lines between two dark fringes is $$\Delta s = 2s = g/2 \tan \delta \tag{4}$$

Ring systems result around the maxima or minima of the reflecting surface 13. By changing δ it is possible to distinguish whether a minimum or a maximum is concerned. For a maximum and minimum a decrease in δ respectively results in an expansion and a contraction of the rings, since the fringes in accordance with (1) shift in the direction of the greater grid spacings. It is obvious that such a differentiation is also possible by changing the grid spacing.

FIG. 2 shows that the maxima of the interference pattern coincide with the opaque areas of grid 12 when the reflecting surface 13 is in the positions 13a, 13b, 13c or 13d. At the positions between the latter the maxima of the reflected interference pattern and the grid openings coincide causing light passing through the grid to be diffracted a second time. Note that the direction of the light bars of the interference field formed by the maxima does not concur with the direction of the radiation contributing to their formation. By selecting a particular direction of observation the diffraction order can be chosen at random. The use of the diffraction order +1 occurring on grid 12 upon the first pass of the radiation through the grid and which is observed in the direction of the zeroth diffraction order 25 of the interference field generated by the second diffraction on the grid has proved to be particularly advantageous. In comparison with the other directions of observation, this direction has the advantage that the non-information carrying radiation 22 reflected as diffraction order +1 upon the radiation's first impinging upon grid 12 and extending in the same direction as the zeroth diffraction order extending in the direction of observation and derived from the diffraction order +1 reflected on surface 13 is essentially less intensive than the zeroth diffraction order 23 reflected on grid 12 and which does not carry information either. Rays 26, 27, and 28 originating from the zeroth diffraction order of the radiation's first passing the grid and of which ray 26 extends in the direction of observation are so spaced from the observed rays 25 that they can be suppressed by a diaphragm. In addition, the diffraction order +1 (ray 22) reflected on grid 12 and the diffraction order +1 (ray 25) reflected on the reflecting surface 13 result in interference fringes that permit intermediate gauging in conjunction with the double diffraction line system of the method of the invention. Those skilled in the art will recognize that the superimposition of parallel light rays 22 and 25 will produce a secondary interference line pattern wherein the spacing between adjacent interference lines is proportional to the relation $\lambda/2\cos\delta_1$ where $\lambda$ is the wavelength of illuminating light and $\delta_1$ is the angle of observation. For small observation angles, $\lambda/2$ is a good approximation. The interference fringes have the same line course as the double diffracted fringes. By observing in the direction of the defraction order +1, the intensity of the gauging fringes is kept low enough so that the double diffraction fringes are readily detected.

Figure 3:
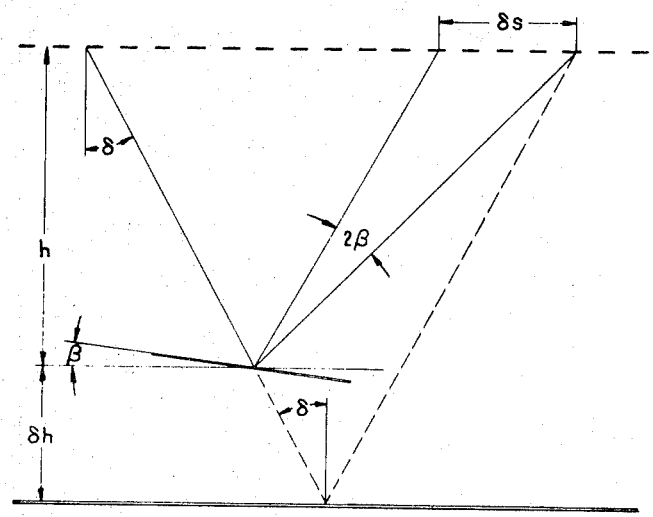
FIG. 3 is a diagrammatic representation illustrating the errors resulting from local tilts of the surface to be tested.

For the method described it is assumed that the ray bundles are reflected on the surface elements which are oriented parallel to the grid plane. This, strictly speaking, merely applies to the maxima or minima of the surface to be tested; elsewhere the surface elements have, as a rule, a slope other than zero. This accounts for the measuring errors $\delta h$ in the distance $h$ of the grid plane from the corresponding surface elements. In FIG. 3 this error for small angles is $$\delta h/h \approx \tan \beta/\tan \delta \tag{5}$$

The error is negligible when high-quality surfaces are tested.

If it is to be tested, however, whether a surface has an unduly high sloping, the grid above the surface is so illuminated that $\delta = 0$, simultaneously determining whether dark fringes have occurred or not. In the latter case the surface is free from unduly high sloping.

FIG. 5 shows an arrangement for applying the method in accordance with the invention. A parallel coherent ray 31 emanating from a laser 30 is increased in its cross-section by lenses 32 and 33 and subsequently impinges upon an optical grid 34 where it is diffracted. The interference field occurring below the grid is reflected on a body 35 to be tested, impinging upon the grid from below. As described in detail in connection with FIG. 2, the resulting double diffraction lines may be directly observed or be observed by means of a screen or a ground-glass plate 36 in the direction of the zeroth diffraction order which is derived from the diffraction order +1 generated upon the ray's first passing the grid.

Figure 4:
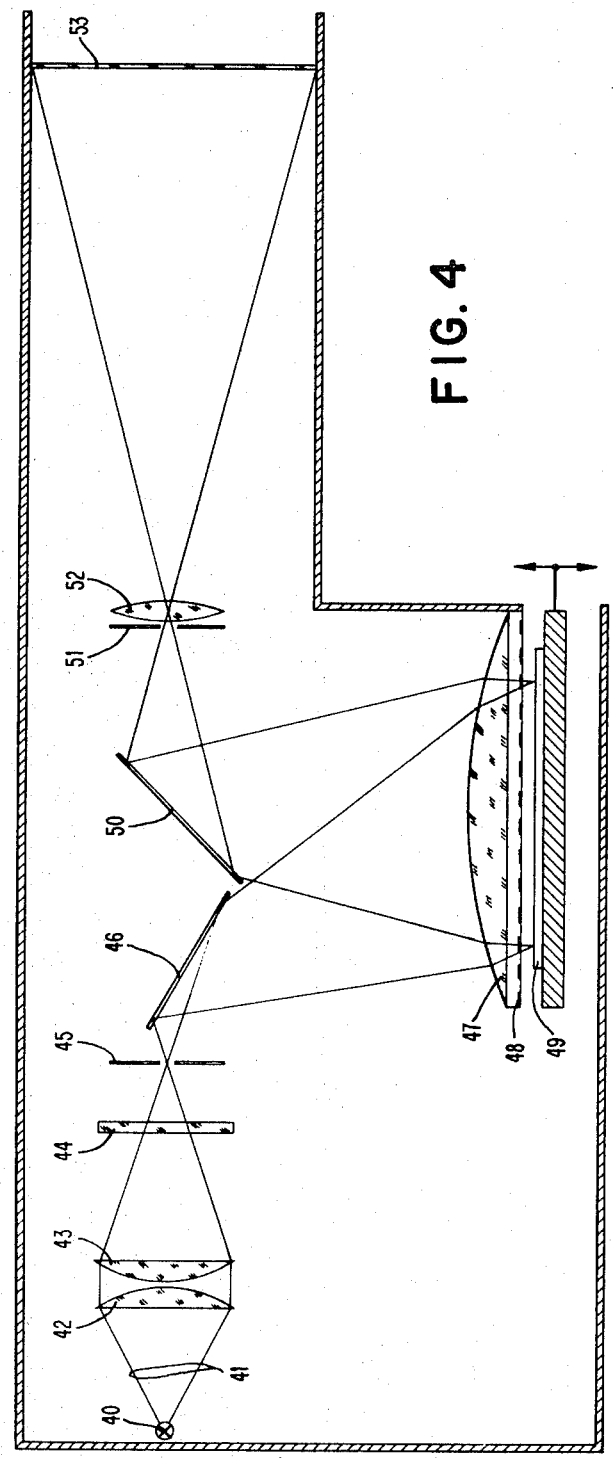
FIG. 4 is a diagrammatic representation of an arrangement for applying the method in accordance with the invention, utilizing incoherent light.

FIG. 4 shows an arrangement for applying the method in accordance with the invention, utilizing incoherent light. Incoherent radiation 41 emanating from a source 40, such as a mercury arc lamp HBO 100, is made to converge by condenser lenses 42 and 43, passing a filter 44 from which it exits as a monochromatic radiation. The radiation subsequently passes an aperture diaphragm 45, being deflected on a mirror 46 in the direction of a field lens 47 behind which a grid 48 and a surface 49 to be tested are arranged. The radiation reflected on the surface to be tested and diffracted for the second time upon passing the grid is deflected by a mirror 50 in the direction of an observation screen 53. Between mirror 50 and observation screen 53 there are provided an aperture diaphragm 51 for suppressing undersirable diffraction orders and stray light, and an imaging lens 52.

The two different types of fringes produced by the above described method are characterized in that the fringes produced by double diffraction are wider than the Fizeau, or or gauging, fringes and are therefore easily identified. By counting the interference fringes between two double diffraction lines it is possible to accurately determine the difference in height of the corresponding areas, which is defined by two adjacent double diffraction lines.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. The method of generating a fringe pattern useful in measuring the irregularities in the evenness of surfaces to be measured, said irregularities being on the order of from about one half to several microns in height comprising the steps of:
    generating an interference field between said grid and said surface by passing a beam of substantially coherent visible light of a known wavelength through an optical grid at an angle of incidence of $\delta_0$ said grid having a grid constant $g$ on the order of from about one to several microns, said grid being spaced from said surface to be measured at a distance of several centimeters;

reflecting said interference field from the surface to be measured back onto said grid to form a first set of fringes corresponding to points on said surface to be measured located at odd multiples of a distance h from said grid, h being equal to $g/(4 \tan \delta)$ where $\delta = (\delta_0 + \delta_1)/2$ and $\delta_1$ is the angle with which the plus first diffraction order of said beam makes with the normal of said grid; and observing said grid in the direction of the zeroth order of the reflected first diffraction order diffracted during the first pass of said beam through said grid in order to simultaneously observe said first set of fringes and a second set of fringes intermediate adjacent ones of said first set of fringes, said second set of fringes being generated by the interference between radiation reflected directly from said grid and radiation reflected from said surface to be measured, said second set of fringes corresponding to points on said surface to be measured representative of the height contours of the surface to be measured at intervals corresponding substantially to one-half the wavelength of light of said beam.

2. The method in accordance with claim 1 wherein, in order to distinguish between convex and concave irregularities, the direction of the light impinging upon the grid is changed causes said first set of fringes to expand and contract for convex and concave irregularities, respectively.

3. The method in accordance with claim 1 wherein, in order to test a surface for the presence of sloping detrimental to the measuring process, the light is directed vertically onto the grid the occurrence of said first set of fringes being indicative of detrimental sloping.

* * * * *

UNITED STATES PATENT OFFICE
CERTIFICATE OF CORRECTION

PATENT NO. : 3,858,981
DATED : January 7, 1975
INVENTOR(S) : Walter Jaerisch and Guenter Makosch It is certified that error appears in the above-identified patent and that said Letters Patent are hereby corrected as shown below:

In the specification, Column 2, line 61, the word "Fizeau" should be deleted.

In Column 6, Claim 1, lines 6 and 7, the phrase "between said grid and said surface" should read --between an optical grid and a surface--.

In Column 8, Claim 2, line 4, the word "causes" should read --causing--.

Signed and Sealed this

Fourteenth Day of September 1976

[SEAL]

Attest:

RUTH C. MASON
Attesting Officer

C. MARSHALL DANN
Commissioner of Patents and Trademarks